US 8,108,731 B2

(12) United States Patent
DeCusatis et al.

(10) Patent No.: US 8,108,731 B2
(45) Date of Patent: Jan. 31, 2012

(54) CONFIGURATION VALIDATION SYSTEM FOR COMPUTER CLUSTERS

(75) Inventors: Casimer M. DeCusatis, Poughkeepsie, NY (US); Aruna V. Ramanan, Poughkeepsie, NY (US); Edward J. Seminaro, Milton, NY (US); Alison B. White, Kingston, NY (US); Daniel G. Young, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 292 days.

(21) Appl. No.: 12/428,767

(22) Filed: Apr. 23, 2009

(65) Prior Publication Data
US 2010/0275064 A1 Oct. 28, 2010

(51) Int. Cl.
*G06F 11/00* (2006.01)
(52) U.S. Cl. .......................................................... 714/37
(58) Field of Classification Search ............... 714/10–12, 714/18–22, 25–28, 37–39, 43, 44, 56
See application file for complete search history.

(56) References Cited

U.S. PATENT DOCUMENTS

| 5,862,145 A | 1/1999 | Grossman et al. |
| 6,640,272 B1 | 10/2003 | Hartwell et al. |
| 6,901,458 B2 | 5/2005 | Vuong |
| 7,047,449 B2 | 5/2006 | Pfeifer et al. |
| 7,337,227 B1 | 2/2008 | Hsieh et al. |
| 7,673,169 B1 * | 3/2010 | Kumaresan et al. ........... 714/4.4 |
| 2003/0104829 A1 * | 6/2003 | Alzoubi et al. ............... 455/517 |
| 2004/0117707 A1 * | 6/2004 | Ellis et al. ....................... 714/733 |
| 2005/0022047 A1 * | 1/2005 | Chandrasekaran ............... 714/4 |
| 2005/0071514 A1 | 3/2005 | Anderson et al. |
| 2006/0179361 A1 | 8/2006 | Archer et al. |
| 2006/0246788 A1 * | 11/2006 | Ewing et al. .................. 439/894 |
| 2007/0061405 A1 | 3/2007 | Keohane et al. |
| 2007/0100574 A1 * | 5/2007 | Grimes et al. ................. 702/118 |
| 2007/0174741 A1 * | 7/2007 | Vasudevan ....................... 714/57 |
| 2008/0065874 A1 * | 3/2008 | Geissler et al. .................... 713/1 |
| 2010/0275071 A1 * | 10/2010 | DeCusatis et al. .............. 714/56 |

* cited by examiner

*Primary Examiner* — Nadeem Iqbal
(74) *Attorney, Agent, or Firm* — Cantor Colburn LLP; Steven Chiu

(57) ABSTRACT

A method of validating a configuration of a computer clusters includes transmitting a first neighbor identification to a first flexible service processor (FSP) arranged in the first computer cluster and a second neighbor identification to a second FSP arranged in the second computer cluster, connecting a first end of a cable to a first transceiver arranged in the first cluster and connecting a second end of the cable to a second transceiver arranged in the second cluster. The first neighbor identification is passed from the first transceiver to the second computer cluster and the second neighbor identification is passed from the second transceiver toward the first computer cluster. The first neighbor identification is compared with a desired first neighbor identification to establish a first comparison result, and the second neighbor identification is compared with a desired second neighbor identification to establish a second comparison result and a notice is generated.

18 Claims, 3 Drawing Sheets

CONFIGURATION VALIDATION SYSTEM FOR COMPUTER CLUSTERS

FEDERAL RESEARCH STATEMENT

This invention was made with Government support under Contract No. HR0011-07-9-0002, awarded by the Defense Advanced Research Projects Agency (DARPA). The Government has certain rights in this invention.

BACKGROUND

The present invention relates to the art of computers and, more particularly, to configuration validation for computer clusters.

Certain computers, such as supercomputers, include massively parallel clusters of computation nodes interconnected by a high bandwidth fiber optic network. Current and next generation supercomputers are enormous in scale and may include up to, for example, a half-million processors housed in over 2,000 drawers that fill close to 200 equipment racks which are interconnected by as many as a half-million fiber-optic cables. Such a supercomputer has a footprint that is equivalent to half a football field. This unprecedented scale gives rise to a serious problem, namely how to correctly physically cable such a machine in a reasonable time period. Identifying and correcting cable errors is problematic, especially for cables that interconnect opposite ends of the supercomputer. Additionally, when nodes are moved, deleted, added or changed, time is lost in re-cabling and correcting cabling errors.

SUMMARY

According to one exemplary embodiment, a method of validating a configuration of computer clusters includes applying partial power to a first computer cluster and a second computer cluster. The method further includes transmitting a first neighbor identification to a first flexible service processor (FSP) arranged in the first computer cluster and a second neighbor identification to a second FSP arranged in the second computer cluster, connecting a first end of a cable to a first transceiver arranged in the first cluster and connecting a second end of the cable to a second transceiver arranged in the second cluster. In addition, the first neighbor identification is passed from the first transceiver to the second computer cluster and the second neighbor identification is passed from the second transceiver toward the first computer cluster. The first neighbor identification is compared with a desired first neighbor identification stored in the second FSP to establish a first comparison result, and the second neighbor identification is compared with a desired second neighbor identification stored in the first FSP to establish a second comparison result. A notice identifying the first and second comparison results is generated.

A system corresponding to the above-summarized method is also described and claimed herein.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
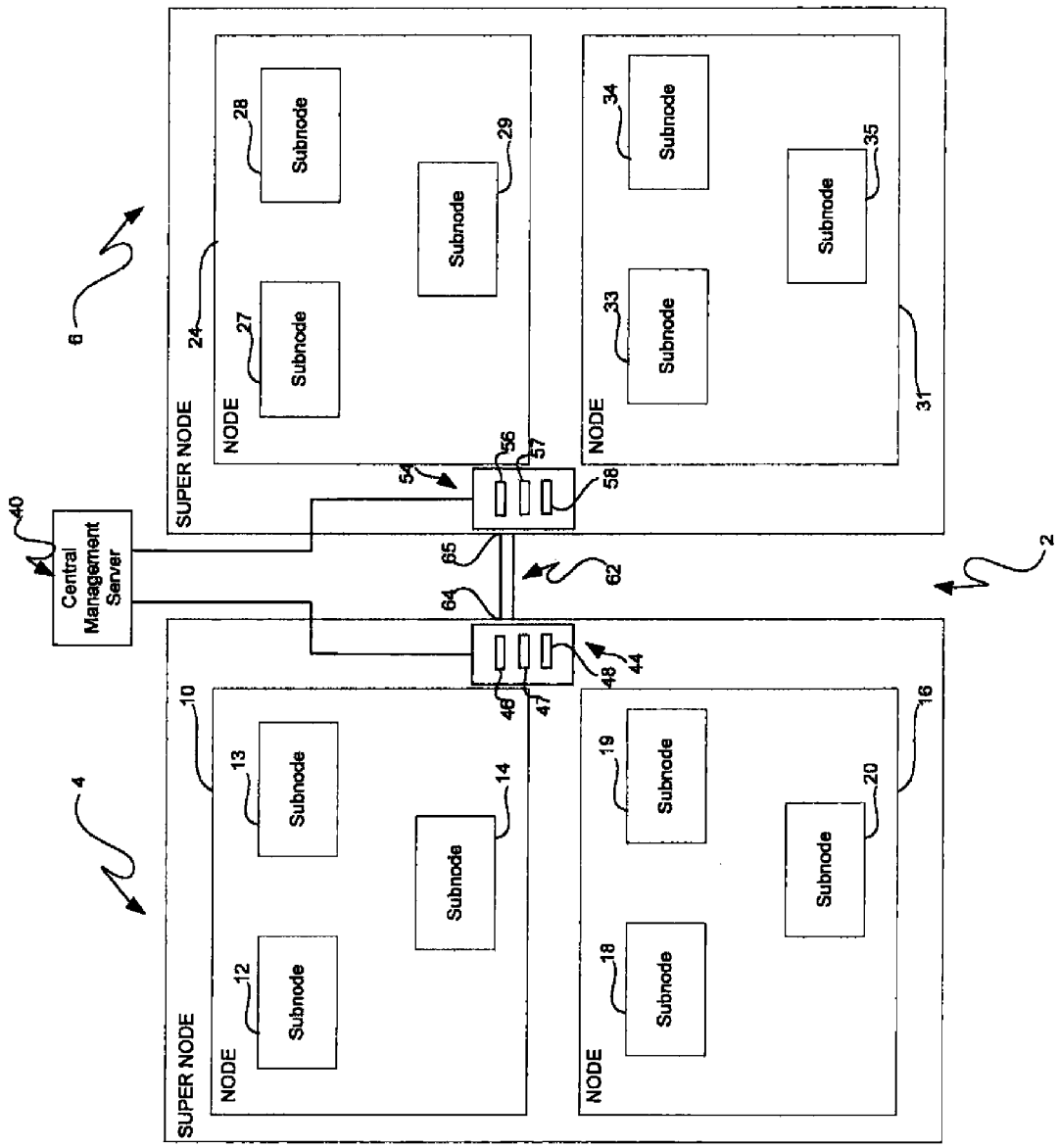
FIG. 1 is a schematic representation of a multi-cluster computer including a configuration validation system in accordance with an exemplary embodiment.

With reference to FIG. 1, a multi-cluster computer constructed in accordance with an exemplary embodiment of the present invention is indicated generally at 2. Multi-cluster computer 2 includes a first cluster or supernode 4 operatively linked to a second cluster or supernode 6. More specifically, first cluster 4 includes a first node 10 having a plurality of subnodes 12-14 associated therewith. First cluster 4 further includes a second node 16 having a plurality of subnodes 18-20 associated therewith. Similarly, second cluster 6 includes a first node 24 having a plurality of subnodes 27-29 associated therewith. Second cluster 6 also includes a second node 31 having a plurality of subnodes 33-35 associated therewith. At this point, it should be understood that the number of clusters, nodes and subnodes can vary widely depending upon the size, configuration and desired application of multi-cluster computer 2. In addition, it should be understood that the particular connectivity between subnodes, nodes and clusters can vary. In further accordance with the exemplary embodiment, first cluster 4 is operatively linked to second cluster 6 via an $I^2C$ bus to a central management server 40. Central management server 40 includes an association table identifying a particular connectivity between the various nodes and subnodes in each of first and second clusters 4 and 6.

In accordance with the exemplary embodiment, multi-cluster computer 2 includes a first validation system 44 associated with first cluster 4. First validation system 44 includes a flexible service processor (FSP) 46, an I/O chip 47 and an optical transceiver 48. Similarly, second cluster 6 includes a second validation system 54 having a flexible service processor (FSP) 56, an I/O chip 57, and an optical transceiver 58. First cluster 4 is further linked to second cluster 6 via a cable 62 which, in the exemplary embodiment shown, takes the form of a fiber optic cable having a first end 64 operatively connected to first validation system 44 and a second end 65 operatively connected to second validation system 54. As will be discussed more fully below, first and second validation systems ensure a proper connection between first and second clusters 4 and 6. That is, as will be discussed more fully below, first and second validation systems 44 and 54 ensure that first cluster 4 is properly connected to second cluster 6.

Figure 2:
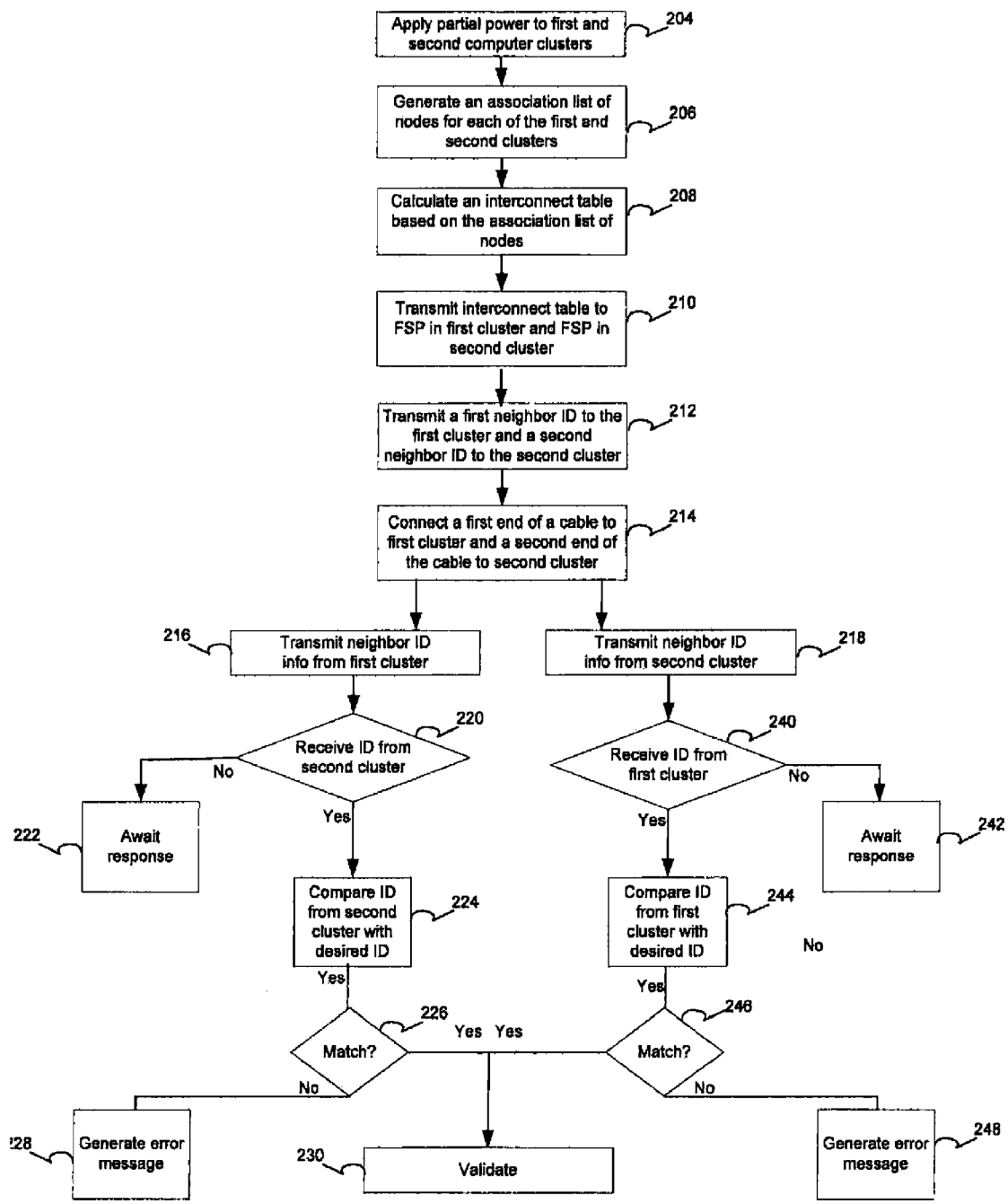
FIG. 2 is a flow diagram illustrating a method of validating a configuration of the multi-cluster computer of FIG. 1.

Reference will now be made to FIG. 2 in describing a method of validating the configuration of first and second clusters 4 and 6. Initially, partial power is applied to first and second computer clusters 4 and 6 as indicated in block 204. The partial power is just sufficient enough to operate validation systems 44 and 54. More specifically, power is only supplied to FSPs 46 and 56, I/O chips 47 and 57, and the optical transceivers 48 and 58. All other components associated with first and second clusters 4 and 6 remain powered off. In this manner, the configuration of first and second clusters 4 and 6 is validated prior to full implementation of multi-cluster computer 2. In addition, by powering only first and second validation systems 44 and 54, there is no need to connect and operate all required liquid or air cooling systems. Once the partial power is applied, an association list of nodes for each of first and second clusters 4 and 6 is generated as indicated in block 206. The association list of nodes identifies the proper configuration of nodes within each of first and second clusters 4 and 6 and the desired configuration of nodes between the first and second clusters 4 and 6. After generating the association list of nodes, an interconnect table based on the association list of nodes is calculated in block 208. That is, central management server 40 determines the desired interconnection requirements and generates a list associating each transceiver with a neighboring transceiver ID. The interconnected table is then transmitted to the FSP 46 in first validation system 44 and FSP 56 in second validation system 54 as indicated in block 210. In addition, a neighbor ID is transmitted to and stored in each validation system 44 and 54 as indicated in block 212.

At this point, cable 62 is connected between first validation system 44 and second validation system 54. More specifically, first end 64 of cable 62 is connected to optical transceiver 48 and second end 65 is connected to optical transceiver 58 as indicated in block 214. Once cable 62 is properly connected, the neighbor ID stored in first cluster 4 is transmitted to second cluster 6 as indicated in block 216. Similarly, the neighbor ID stored in second cluster 6 is transmitted to first cluster 4 as indicated in block 218. At this point, a determination is made if the neighbor ID from second cluster 6 has been received by first cluster 4 as indicated in block 220. If no neighbor ID is received, a timer is initiated for a predetermined time period to await a response as indicated in block 222. If however, the neighbor ID is received from second cluster 6, the ID is compared with a desired neighbor ID in block 224 to determine a comparison result. That is, the neighbor ID received from second cluster 6 is compared with a desired neighbor ID contained within the association list of nodes to ensure that cable 62 is properly connected to first node 4 from second node 6. If the comparison result is negative, i.e., the neighbor ID received from node 6 does not match the desired neighbor ID as indicated in block 226, an error message, e.g., identifying the incorrectly matched transceiver(s) and error type is generated in block 228. An error message is also generated at the end of the pre-determined time period if no neighbor ID is received. If however, the comparison result is positive, i.e., a match is found, a validation signal is generated in block 230.

Similarly, second cluster 6 determines whether a neighbor ID is received from first cluster 4 as indicated in block 240. If no neighbor ID is received, a timer is set to a pre-determined time period to await the response as indicated in block 242. If the neighbor ID has been received from first cluster 4, the neighbor ID is compared with a desired neighbor ID as indicated in block 244. In a manner similar to that described above, the neighbor ID received from first cluster 4 is compared with a desired neighbor ID found in the association list of nodes generated in block 206 to determine a comparison result. A determination is made whether the comparison result is positive or negative in block 246. If comparison result is negative, i.e., the transmitted neighbor ID and the desired neighbor ID do not match, an error message is generated in block 248. An error message is also generated at the end of the pre-determined time period if no neighbor ID is received. If however, the comparison result is positive, i.e., a match is found between the transmitted neighbor ID and the desired neighbor ID a validation signal is generated in block 230. In this manner, the present invention employs a cross check to ensure that first node 4 is properly connected to second node 6 and that second node 6 is properly connected to first node 4. Error messages are generated at either first end 64 of cable 62 is improperly connected or second end 65 of cable 62 is improperly connected. Of course, if both ends 64 and 65 return an error message an error notice is also generated.

At this point, it should be understood that the present invention allows the configuration of the system to be implements in real time from the central monitoring processor while installation is in process, cabling errors are found and corrected immediately. Alternatively, an authorized laptop may be connected to each cluster and the status of the cluster's SSP can be queried. In addition, when a transceiver node changed, for example during system reconfiguration or repair, the process of validating connections is repeated with new ID information.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

Figure 3:
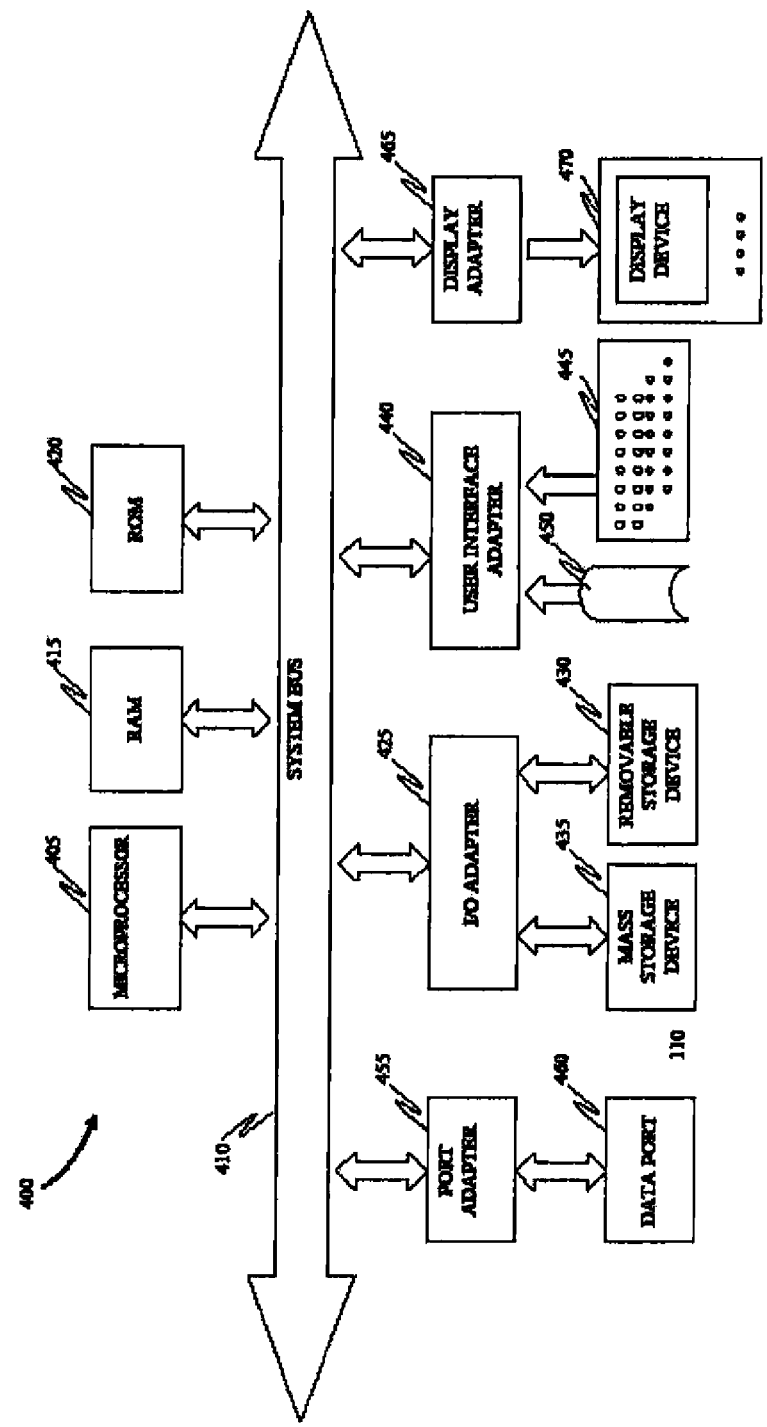
FIG. 3 is a schematic block diagram of a general-purpose computer suitable for practicing the exemplary method.

Generally, the method of validating configurations described herein is practiced with a general-purpose computer and the method may be coded as a set of instructions on removable or hard media for use by the general-purpose computer. FIG. 3 is a schematic block diagram of a general-purpose computer suitable for practicing the present invention embodiments. In FIG. 3, computer system 400 has at least one microprocessor or central processing unit (CPU) 405. CPU 405 is interconnected via a system bus 410 to a random access memory (RAM) 415, a read-only memory (ROM) 420, an input/output (I/O) adapter 425 for a connecting a removable data and/or program storage device 430 and a mass data and/or program storage device 435, a user interface adapter 440 for connecting a keyboard 445 and a mouse 450, a port adapter 455 for connecting a data port 460 and a display adapter 465 for connecting a display device 470.

ROM 420 contains the basic operating system for computer system 400. The operating system may alternatively reside in RAM 415 or elsewhere as is known in the art. Examples of removable data and/or program storage device 430 include magnetic media such as floppy drives and tape drives and optical media such as CD ROM drives. Examples of mass data and/or program storage device 435 include hard disk drives and non-volatile memory such as flash memory. In addition to keyboard 445 and mouse 450, other user input devices such as trackballs, writing tablets, pressure pads, microphones, light pens and position-sensing screen displays may be connected to user interface 440. Examples of display devices include cathode-ray tubes (CRT) and liquid crystal displays (LCD).

The flow diagram depicted herein is just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method of validating a configuration of computer clusters, the method comprising:

applying partial power to a first computer cluster and a second computer cluster, the partial power being sufficient to provide minimal power to operate secondary systems;

transmitting a first neighbor identification to a first flexible service processor (FSP) arranged in the first computer cluster and a second neighbor identification to a second FSP arranged in the second computer cluster;

connecting a first end of a cable to a first transceiver arranged in the first cluster and connecting a second end of the cable to a second transceiver arranged in the second cluster;

passing the first neighbor identification from the first transceiver to the second computer cluster and the second neighbor identification from the second transceiver toward the first computer cluster;

comparing the first neighbor identification with a desired first neighbor identification stored in the second FSP to establish a first comparison result;

comparing the second neighbor identification with a desired second neighbor identification stored in the first FSP to establish a second comparison result; and generating a notice identifying the first and second comparison results.

2. The method of claim 1, further comprising: generating within a central management server an association list of nodes in each of the first and second computer clusters, the association list of nodes establishing the first neighbor identification and the second neighbor identification.

3. The method of claim 2, further comprising: calculating an interconnect table based upon the association list of nodes.

4. The method of claim 3, further comprising: passing the interconnect table to the FSP in the first cluster and the FSP in the second cluster, the interconnect table containing the desired first neighbor identification and the desired second neighbor identification.

5. The method of claim 1, wherein generating the notice identifying the first and second comparison results comprises generating an error message whenever both of the first and second comparison results is negative.

6. The method of claim 1, wherein generating the notice identifying the first and second comparison results comprises generating an error message whenever one of the first and second comparison results is negative.

7. The method of claim 1, wherein generating the notice identifying the first and second comparison results comprises generating a validation message whenever both of the first and second comparison results is positive.

8. The method of claim 1, wherein generating the notice identifying the first and second comparison results comprises generating one of a visual alert and an audible alert.

9. The method of claim 1, further comprising:
setting a timer to a first time limit whenever the second neighbor identification is not received at the first cluster; and
generating an alert whenever the second neighbor identification is not received at the first cluster at the expiration of the time limit.

10. A system for validating computer cluster configurations, comprising:
a central processing unit (CPU), said CPU being interconnected functionally via a system bus to:
an input/output (I/O) adapter connecting to at least one of a removable data storage device, a program storage device, and a mass data storage device;
a user interface adapter connecting to one or more computer input devices;
a display adapter connecting to a display device; and
at least one memory device thereupon stored a set of instructions which, when executed by said CPU, causes said system to:
transmit a first neighbor identification to a first flexible service processor (FSP) arranged in a first computer cluster and a second neighbor identification to a second FSP arranged in a second computer cluster;
passing the first neighbor identification from a first transceiver through a cable to the second computer cluster, and the second neighbor identification from a second transceiver through the cable toward the first computer cluster;
compare the first neighbor identification with a desired first neighbor identification stored in the second FSP to establish a first comparison result;
compare the second neighbor identification with a desired second neighbor identification stored in the first FSP to establish a second comparison result; and
generate a notice identifying the first and second comparison results.

11. The system according to claim 10, wherein the set of instructions when executed by said CPU, causes said system to: generate, within a central management server, an association list of nodes in each of the first and second computer clusters, the association list of nodes establishing the first neighbor identification and the second neighbor identification.

12. The system according to claim 11, wherein the set of instructions when executed by said CPU, causes said system to: calculate an interconnect table based upon the association list of nodes.

13. The system according to claim 12, wherein the set of instructions when executed by said CPU, causes said system to: pass the interconnect table to the FSP in the first cluster and the FSP in the second cluster, the interconnect table containing the desired first neighbor identification and the desired second neighbor identification.

14. The system according to claim 10, wherein the set of instructions when executed by said CPU, causes said system to: generate an error message whenever both of the first and second comparison results is negative.

15. The system according to claim 10, wherein the set of instructions when executed by said CPU, causes said system to: generate an error message whenever one of the first and second comparison results is negative.

16. The system according to claim 10, wherein the set of instructions when executed by said CPU, causes said system to: generate a validation message whenever both of the first and second comparison results is positive.

17. The system according to claim 10, wherein the set of instructions when executed by said CPU, causes said system to: generate one of a visual alert and an audible alert.

18. The system according to claim 10, wherein the set of instructions when executed by said CPU, causes said system to:
set a timer to a first time limit whenever the second neighbor identification is not received at the first cluster; and
generate an alert whenever the second neighbor identification is not received at the first cluster at the expiration of the time limit.

* * * * *